United States Patent Office 3,146,432
Patented Aug. 25, 1964

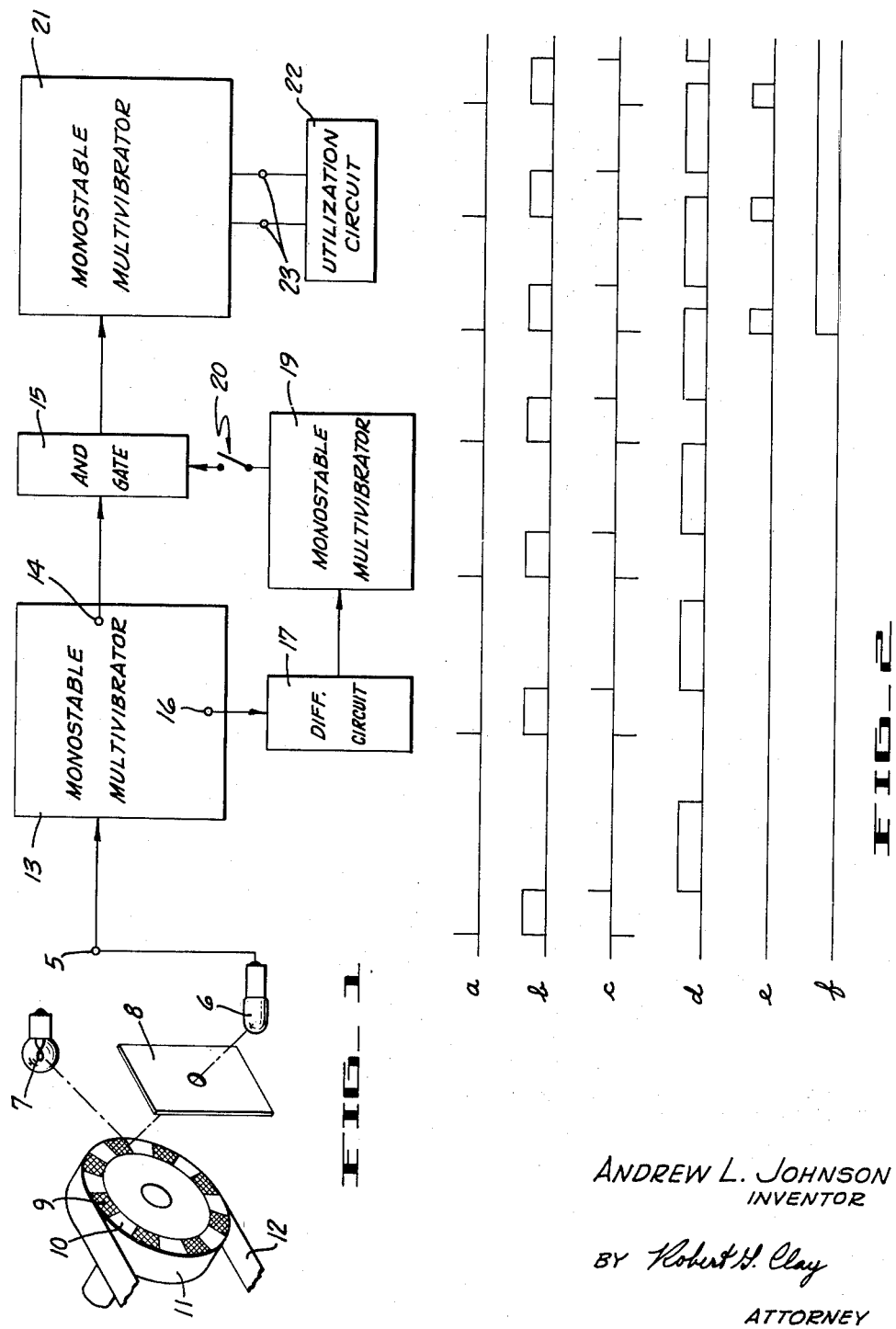

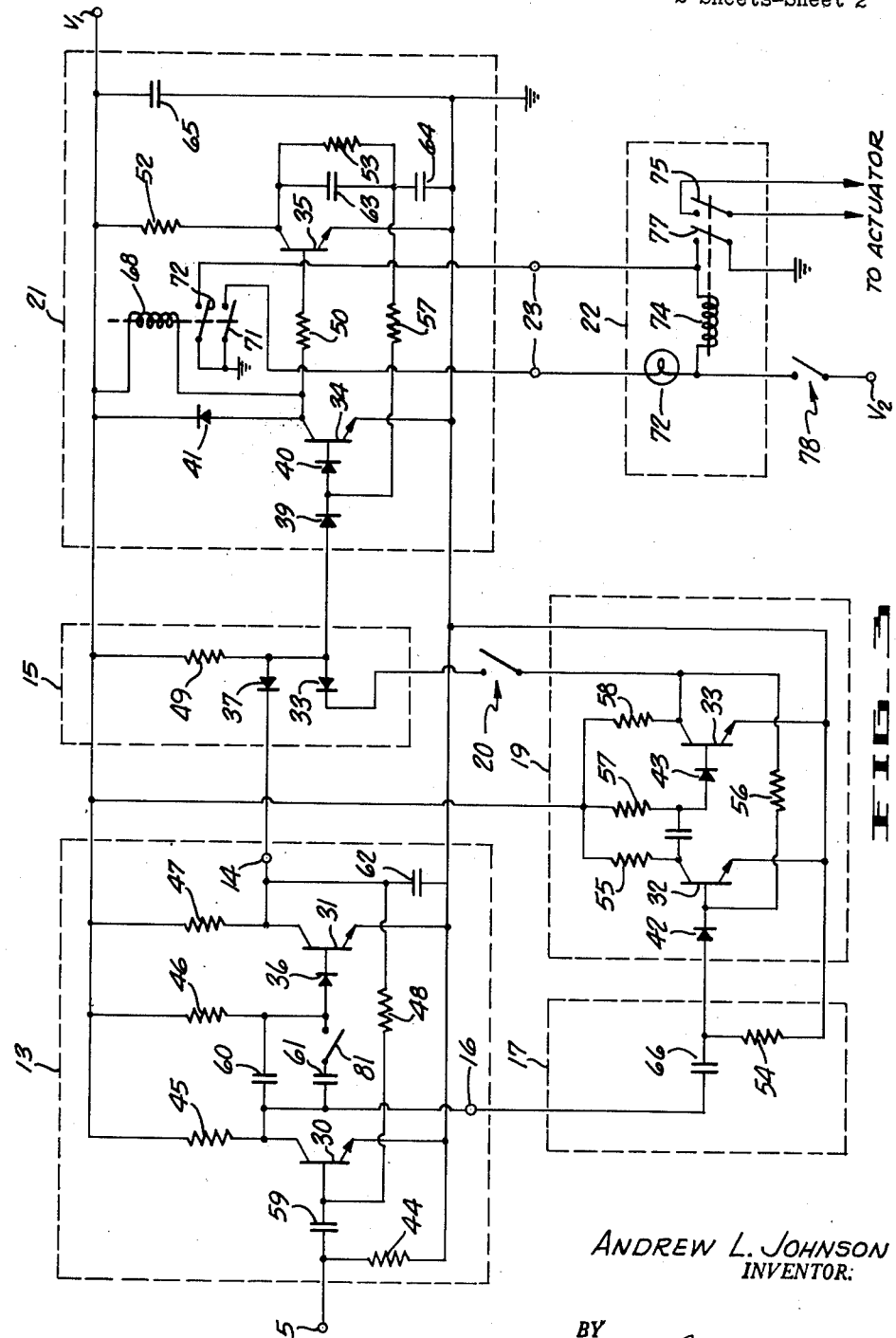

3,146,432
VELOCITY OR FREQUENCY SENSING MEANS
Andrew L. Johnson, Mountain View, Calif., assignor to Ampex Corporation, Redwood City, Calif., a corporation of California
Filed Oct. 3, 1960, Ser. No. 60,090
8 Claims. (Cl. 340—263)

This invention relates to sensing means and in particular to means for sensing a predetermined frequency or velocity.

There are many occasions when it is required to know at what point in time a particular frequency or velocity is obtained from a variable frequency or velocity source. One particular instance arises during the use of magnetic tape transport systems utilizing a capstan and pinch roller assembly. It is advantageous to clamp the pinch roller when the peripheral speed of the capstan is approximately the same as the speed of the tape. If the pinch roller is engaged before the capstan periphery is moving at the tape speed, the instantaneous change in velocity of the tape may cause breakage of the tape.

There are many other applications for a device that can conveniently and accurately determine when a predetermined velocity is obtained. Likewise, there are many applications for a device that can determine when a predetermined frequency is obtained.

It is, therefore, a general object of this invention to provide an improved frequency or velocity sensing device.

It is another object of this invention to provide a frequency or velocity sensing device in which a utilization circuit is actuated when a predetermined frequency or velocity is achieved.

It is still another object of this invention to provide a sensing circuit having the aforementioned characteristics wherein the predetermined frequency or velocity can easily be changed.

It is still another object of this invention to provide the sensing circuit having the aforementioned characteristics utilizing semiconductor devices.

In accordance with the present invention a velocity sensing circuit is provided wherein velocity is translated into frequency and an output is developed at a frequency corresponding to a predetermined value of velocity. To obtain such result a first monostable multivibrator responds to pulses having a frequency proportional to the velocity being sensed. A pulse having a predetermined duration is developed by the first multivibrator and applied to an AND gate and through a differentiator to a second monostable multivibrator. A pulse having a leading edge coinciding with the trailing edge of the pulse of the first multivibrator is then developed by the second multivibrator and also applied to the AND gate. The duration of the output pulse of the second multivibrator is preselected so that the sum of the durations is slightly greater than the period of the frequency corresponding to the predetermined velocity. Coincidence or overlap between the trailing edge of the pulse of the second multivibrator with the leading edge of the pulse of the first multivibrator then results in an output at the AND gate to trigger a third monostable multivibrator, the output of which is connected to drive a utilization circuit.

The invention will be described in greater detail in conjunction with the accompanying drawings in which:

FIGURE 1 is a block diagram of a circuit utilizing the invention;

FIGURE 2 is a pulse timing chart of the circuit, in accordance with one embodiment of this invention; and FIGURE 3 is a schematic diagram of the circuit of FIGURE 1.

In FIGURE 1, a block diagram of one embodiment of the circuit of the invention is shown. An input terminal 5 is coupled to a first monostable multivibrator 13. One output 14 of the multivibrator 13 is coupled to a coincidence or AND gate 15 and the other output 16 to a differentiating circuit 17. The output of the differentiating circuit 17 is coupled to a second monostable mutlivibrator 19. The output of the second multivibrator 19 is utilized as the second input to the AND gate 15. A disabling switch 20 is connected in the line 14–15 and in the output line of the AND gate 15, but as illustrated the switch 20 is positioned so that the output of the AND gate 15 is applied as an input to a third monostable multivibrator 21. The output of the multivibrator 21 is applied to a utilization circuit 22 from output terminals 23.

The operation of the circuit can be more clearly understood in conjunction with the pulse timing chart of FIGURE 2. Input pulses are shown in FIGURE 2(a) and are derived to be dependent in frequency upon the velocity of an external element. The pulses are applied to the terminal 5 and may be derived, for example, from a photoelectric cell 6 (FIGURE 1) and cooperating light source 7 reflecting, as through a screen 8, from alternate light and dark sections 9 and 10 of a rotating member such as an idler 11 driven by a tape 12, so that the frequency of the pulses emitted by cell 6 is a function of the linear velocity of the tape 12.

The application of pulses at the input of the multivibrator 13 initiates positive pulses at the output 14 of the multivibrator 13 as shown in FIGURE 2(b). At the beginning of operation the pulses are farther apart than at the end. This condition indicates that the velocity of the external element or the frequency of the pulses is increasing. Since the pulse width produced by the multivibrator 13 is uniform, the distance between the pulses decreases as the frequency of the pulses applied to the input 11 increases. Although the duration of the pulse at the output 14 of the multivibrator 13 is of a predetermined length, it may be made variable dependent upon the various frequencies or velocities to be sensed.

The output 16 of the multivibrator 13 is applied to the differentiator 17 to produce pulses as shown in FIGURE 2(c). The application of the positive spikes from the differentiator 17 to the multivibrator 19 produces a positive pulse output of the multivibrator 19 as shown in FIGURE 2(d). The output pulses of the multivibrator 19, like those of the multivibrator 13, are of a predetermined length. The length of the pulses from the multivibrator 19 is chosen to be slightly greater than the distance between the pulses from the multivibrator 13 when the frequency of the input pulses at the terminal 11 is at the desired value.

Both the pulses from the multivibrator 19 and the pulses from the output 14 of multivibrator 13 are applied as inputs to the coincidence or AND gate 15. It will be noted that while the input frequency is lower than its normal value, no coincidence appears between the output of the multivibrators 13 and 19. However, as the frequency of the input pulses is increased to approach that of the predetermined frequency, coincidence occurs and an output pulse is produced at the AND gate 15.

The output pulse of the AND gate 15, as shown in FIGURE 2(e) is applied as an input to the multivibrator 21. In the embodiment of the invention shown, the multivibrator 21 has a long period. Consequently, an output pulse as shown in FIGURE 2(f) is initiated upon the occurrence of the first output pulse from the AND gate 15. The first output pulse, FIGURE 2(f), of the multivibrator 21, thus indicates that the desired frequency or velocity has been attained as by the idler 11 or tape 12.

In order to provide a circuit that is useful not only for a single input frequency but for several, it is merely necessary to provide a variation in the output pulse width of the multivibrator 13 or of the multivibrator 19. In the embodiment shown, the multivibrator 13 is provided with a variable pulse width. To provide an output to the utilization circuit at a lower frequency than that shown in FIGURE 2, it is only necessary to increase the pulse width from the output of the multivibrator 13. It is apparent that with an increase in the output pulse width of the multivibrator 19, the same result is accomplished.

When the circuit is used to engage a capstan in a magnetic tape transport system, it is necessary that the capstan be engaged with the tape at the tape speed only when the higher tape speeds are utilized. When the lower tape speeds are utilized, it is convenient to disable the velocity or frequency sensing circuit and provide for engagement of the capstan at all times. For this purpose, the switch 20 is utilized. Whenever it is convenient to disable the circuit, the switch 20 may be opened so as to disconnect the multivibrator 19 from the AND gate 15, and to couple the multivibrators 13 and 21 together. Consequently, whenever a pulse output appears at the multivibrator 13, the utilization circuit 22 will be activated from the terminals 23. With the utilization circuit 22 connected to the capstan engagement means, the capstan will always be engaged at the lower speeds of the tape when the switch 20 is opened.

A frequency sensing circuit in accordance with the present invention is shown in detail in FIGURE 3. Thus, the input at terminal 5 as derived from the idler 11 is coupled to two transistors 30, 31 interconnected to provide operation in the manner described for monostable multivibrator 13. Included in the circuit of the multivibrator 13 is a manual switch 81 for varying the time constant of the circuit by decreasing the coupling capacitance between the two transistors 30 and 31.

Output 14 of the multivibrator 13 is coupled to the AND gate 15 or to multivibrator 21. Output 16 of the multivibrator 13 is coupled to the differentiator 17, which is a conventional resistance-capacitance circuit, and provides an input to multivibrator 19. The latter multivibrator 19 is similar to multivibrator 13 and has two interconnected transistors 32 and 33. The output of the multivibrator 19 is then selectively coupled to the AND gate 15 by way of switch 20.

The AND gate 15 is conventional and has two diodes 33 and 37 interconnected to provide an output only when there is a coincidence of positive pulses at the respective inputs. Thus, upon coincidence of input signals an output pulse of the AND gate 15 triggers the multivibrator 21, which is also similar to multivibrator 13 and has two interconnected transistors 34 and 63. The output of the multivibrator 21 is derived, as shown in FIGURE 3, from contacts 71, 73 of a relay operated by a solenoid 68. One side of each contact 71 and 73 is connected to ground and the other sides thereof are respectively connected to terminals 23. A first series circuit comprising a lamp 72 and a manual switch 78 is connected between one terminal 23 and a source of direct current, indicated as V₂. A second series circuit including the switch 78 and a solenoid 74 of a relay is connected between the source V₂ and the other terminal 23. Solenoid 74 operates two normally open contacts 75 and 77 with contact 75 being in series with an actuator circuit of a magnetic tape recorder to move the pinch roller toward the capstan and clamp the tape therebetween. The other contact 77 bypasses the contact 73 by connecting one side to ground and the other side between contact 73 and solenoid 74, so as to hold solenoid 74 in energized condition.

It will be seen that the lamp 72 is illuminated only during the duration of the output pulse (FIGURE 2(f)) of multivibrator 21. During the intervals between such pulses, the lamp is off, although, of course, the actuator circuit remains energized. Thus the lamp, while it is blinking on and off, indicates that the tape 12 is moving at the correct speed. But if the tape, having once arrived at the correct speed, subsequently drops below this speed, then the multivibrator ceases to supply output pulses, and the lamp 72 remains off to provide a warning indication. The actuator circuit however remains energized until the switch 78 is manually opened. The duration of the output pulse for multivibrator 21, and the time interval between such pulses, is established by the values of the capacitors 63 and 64 and resistors 51 and 53.

A circuit in accordance with the invention and conforming to the circuit diagram of FIGURE 3 has been built and operated utilizing the following components:

Voltage:
V _____ +25 v. D.C.

Transistors:
30–35 _____ 2N 332

Diodes:
36–43 _____ 1N 461

Resistors (ohms):
44 _____ 15K
45 _____ 10K
46 _____ 150K
47 _____ 47K
48 _____ 10K
49 _____ 150K
50 _____ 100K
51 _____ 10K
52 _____ 22K
53 _____ 150K
54 _____ 100K
55 _____ 10K
56 _____ 10K
57 _____ 150K
58 _____ 47K
84 _____ 1K Capacitors (microfarads):
59 _____ 0.1
60 _____ .047
61 _____ .15
62 _____ .01
63 _____ 8
64 _____ .047
65 _____ 8
66 _____ .022
67 _____ .015

With the above circuit, the capacitor 60 is used alone when sensing pulses occurring eighty times per second, and the capacitors 60 and 61 are used in parallel to sense pulses occurring at forty times per second, the connection of capacitor 61 into the circuit in parallel with capacitor 60 being controlled by manually operated switch 81.

Thus, it is seen that a novel frequency or velocity sensing means has been provided wherein operation of a utilization circuit is caused by the occurrence of a predetermined input frequency.

What is claimed is:

1. A sensing circuit for determining a preselected input frequency, comprising: means for producing first pulses of a predetermined time duration responsive to said input, said time duration being less than the period of said preselected frequency, means responsive to termination of said first pulses for producing corresponding second pulses each beginning with the termination of a corresponding first pulse and having a predetermined time duration greater than the difference between said period and the duration of said corresponding first pulse, the time duration from beginning to end of each pair of corresponding first and second pulses being slightly greater than the period of said input at the preselected frequency, and gating means coupled directly to said first and second named means for receiving said first and second pulses and developing an output at coincidence.

2. A sensing circuit for determining a preselected input frequency, comprising: means for producing first pulses of a predetermined time duration responsive to said input, said time duration being less than the period of said preselected frequency, means responsive to termination of said first pulses for producing corresponding second pulses each beginning with the termination of a corresponding first pulse and having a predetermined time duration greater than the difference between said period and the duration of said corresponding first pulse, the time duration from beginning to end of each pair of corresponding first and second pulses being slightly greater than the period of said input at the preselected frequency, gating means coupled directly to said first and second named means for receiving said first and second pulses and developing an output at coincidence, and means connected to said gating means and responding to said coincidence output for producing a third pulse of a predetermined time duration.

3. A sensing circuit for detecting a preselected frequency, comprising: a first and a second monostable multivibrator, the output pulse widths of both said multivibrators being less than the period of said preselected frequency, the sum of the output pulse widths of both said multivibrators being slightly greater than the period of said preselected frequency; input means for applying said frequency to be sensed to said first multivibrator; means coupled between the output of said first multivibrator and the input of said second multivibrator for initiating an output from said second multivibrator upon cessation of said output pulse of the first multivibrator; and gate means coupled directly to the output of both said multivibrators whereby an output pulse is caused upon coincidence of pulses from said multivibrators.

4. A sensing circuit as described in claim 3, including a third monostable multivibrator coupled to the output of said gate means for producing an output pulse in response to each pulse from said gate means, said output pulse having a greater time duration than the period of said preselected frequency.

5. A circuit as characterized in claim 3, wherein said means coupling the output of said first multivibrator to the input of said second multivibrator includes a differentiating circuit producing spike pulses of opposite phase in response to the leading and trailing edges of each first multivibrator pulse, with said second multivibrator being responsive only to said spike pulses corresponding with said trailing edges for initiating said second multivibrator output pulses.

6. A sensing circuit as characterized in claim 3, wherein at least one of said multivibrators is frequency variable for selectively varying the time duration of the output pulse thereof, whereby said circuit is capable of responding to a variety of input signal periods.

7. A circuit for sensing the occurrence of a preselected velocity of a variable velocity element comprising means for producing first pulses dependent upon said variable velocity, means for producing second pulses having a predetermined time duration responsive to said first pulses, said predetermined duration of said second pulses being less than the period of said first pulses when said preselected velocity occurs, means responsive to termination of said second pulses for producing third pulses each beginning with the termination of a corresponding second pulse and having a predetermined time duration, the time duration of said third pulses being slightly greater than the difference between the period of said first pulses when the preselected velocity occurs and the time duration of said second pulses, and gating means coupled directly to said second and third named means for receiving said second and third pulses to determine coincidence thereof as an indication of said preselected velocity.

8. A circuit for indicating when the velocity of a moving tape exceeds a preselected value, comprising: a drum engaging said tape and revolving therewith at a peripheral linear velocity equal to the linear velocity of said tape, said drum having peripherally arranged alternate light reflecting and non-reflecting areas; a light source positioned to illuminate said areas in movement; a photoelectric cell positioned to receive reflected light from said areas in passage through a predetermined zone so as to produce first pulses in response to said light-reflecting areas, said first pulses having a cyclical period proportional to the velocity of said tape; a first monostable multivibrator coupled to said photoelectric cell to receive said first pulses therefrom and to produce second pulses of preselected time duration in response to said first pulses, said preselected time duration being substantially less than the recurrence period of said first pulses when said tape is moving at said preselected velocity; a differentiating circuit coupled to said first multivibrator and responding to the trailing edges of said second pulses to produce spike pulses of predetermined polarity; a second monostable multivibrator coupled to said differentiating circuit and responding to said spike pulses to produce third pulses of preselected time duration not less than the difference between said recurrence period and said second pulse duration; a gate circuit coupled directly to said multivibrators and responding to coincidence of said second and third pulses to produce fourth pulses of time duration corresponding with the duration of said coincidence; and a third monostable multivibrator coupled to said gate circuit and responding to said fourth pulses to produce an output pulse of time duration not less than said recurrence period when said tape is moving at substantially said preselected velocity.

References Cited in the file of this patent
UNITED STATES PATENTS

| | | |
|---|---|---|
| 2,451,816 | Dunn | Oct. 19, 1948 |
| 2,563,879 | Soukaras | Aug. 14, 1951 |
| 2,685,082 | Beman | July 27, 1954 |
| 2,769,949 | Stratton | Nov. 6, 1956 |
| 2,933,729 | McElroy | Apr. 19, 1960 |
| 2,968,803 | Lindley | Jan. 17, 1961 |

OTHER REFERENCES

Publication: Seith, IBM Technical Disclosure Bulletin, vol. 4, No. 11, pp. 38, 39.